(12) United States Patent
Su et al.

(10) Patent No.: US 11,897,575 B2
(45) Date of Patent: Feb. 13, 2024

(54) HYDRAULIC BICYCLE CONTROL DEVICE

(71) Applicant: SRAM, LLC, Chicago, IL (US)

(72) Inventors: Chihui Su, Taichung (TW); Yen-Pang Liu, Taichung (TW)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 17/020,354

(22) Filed: Sep. 14, 2020

(65) Prior Publication Data
US 2021/0078671 A1    Mar. 18, 2021

Related U.S. Application Data

(60) Provisional application No. 62/900,975, filed on Sep. 16, 2019.

(51) Int. Cl.
*B62L 3/02* (2006.01)

(52) U.S. Cl.
CPC .................................. *B62L 3/023* (2013.01)

(58) Field of Classification Search
CPC ......... B62L 3/023; B60T 11/165; B60T 7/102
See application file for complete search history.

(56) References Cited

U.S. PATENT DOCUMENTS

| | | | |
|---|---|---|---|
| 2012/0240715 A1 | 9/2012 | Tsai | |
| 2015/0367908 A1* | 12/2015 | Kariyama | B62L 3/023 |
| | | | 188/344 |
| 2016/0129966 A1* | 5/2016 | Meggiolan | B62K 23/02 |
| | | | 74/491 |
| 2016/0200390 A1* | 7/2016 | Carrasco Vergara | B62K 23/06 |
| | | | 60/594 |
| 2016/0264213 A1* | 9/2016 | Swanson | B62M 25/08 |
| 2017/0361819 A1* | 12/2017 | Miki | B62K 23/06 |
| 2017/0361896 A1* | 12/2017 | Miki | B62M 25/04 |
| 2020/0407011 A1* | 12/2020 | Luman | B62L 3/023 |
| 2021/0179047 A1* | 6/2021 | Bove | B60T 11/228 |
| 2022/0144378 A1* | 5/2022 | Swanson | B62L 3/023 |

FOREIGN PATENT DOCUMENTS

| | | |
|---|---|---|
| CN | 100584687 C | 1/2010 |
| CN | 206231543 U | 6/2017 |
| CN | 105035242 | 3/2019 |
| TW | 201623080 | 7/2016 |
| TW | 201823100 | 7/2018 |
| TW | 201840449 | 11/2018 |

\* cited by examiner

*Primary Examiner* — Vinh Luong

(57) ABSTRACT

A brake control device includes a housing, a brake lever, a hydraulic seat and a piston. The housing is formed of a plastic and includes a handlebar mounting portion at an end thereof that is mounted to a bicycle handlebar. The brake lever is pivotably connected to the housing at a pivot of the housing. The hydraulic seat is disposed within the housing and is distal from the handlebar mounting portion. The hydraulic seat is formed of a metal and defines a piston chamber and a hydraulic reservoir therein that are in fluid communication with each other. The piston is movably mounted to the piston chamber in the hydraulic seat, and is operably connected to the brake lever. The plastic of the housing is adhered to the hydraulic seat.

18 Claims, 7 Drawing Sheets

HYDRAULIC BICYCLE CONTROL DEVICE

PRIORITY

This application claims the benefit of U.S. Provisional Patent Application No. 62/900,975, filed on Sep. 16, 2019, which is hereby incorporated by reference in its entirety.

FIELD

The disclosure relates to a control device, and more particularly to a hydraulic brake control device for a bicycle brake system.

BACKGROUND

Referring to FIG. 1, a conventional bicycle brake control device disclosed in U.S. Patent Application Publication No. 2012/0240715 A1 includes a housing 11, a brake lever 12 pivotally connected to the housing 11, a hydraulic cylinder 13 mounted in the housing 11, and an outer cover 14 mounted on the housing 11. In assembly of the conventional brake control device, before the hydraulic cylinder 13 is moved into the housing 11, the hydraulic cylinder 13 needs to be installed with a piston (not shown) and mounted with a bolt 16 so as to communicate with a fluid hose 15, all of which contribute to a laborious nature of the process.

SUMMARY

Therefore, an object of the disclosure is to provide a brake control device that can alleviate the drawback of the prior art.

According to one aspect of the disclosure, the brake control device includes a housing, a brake lever, a hydraulic seat and a piston. The housing is formed of a plastic and is sized and shaped to be grasped by a user's hand. The housing includes a handlebar mounting portion at an end thereof that is configured to be mounted to a bicycle handlebar. The brake lever is pivotably connected to the housing at a pivot of the housing. The hydraulic seat is disposed within the housing at another end of the housing that is distal from the handlebar mounting portion. The hydraulic seat is formed of a metal and defines a piston chamber and a hydraulic reservoir therein that are in fluid communication with each other. The piston is movably mounted to the piston chamber in the hydraulic seat, and is operably connected to the brake lever. The plastic of the housing is adhered to the hydraulic seat.

According to another aspect of the disclosure, the brake control device includes a housing, a brake lever, a hydraulic seat and a piston. The housing is formed of a first material, is sized and shaped to be grasped by a user's hand, and includes a handlebar mounting portion that is configured to be mounted to a bicycle handlebar about a mounting axis of the handlebar mounting portion. The brake lever is pivotably mounted to the housing at a pivot location of the housing. The hydraulic seat is formed as a single piece from a second material and is disposed within the housing. The hydraulic seat defines a piston chamber and a hydraulic reservoir therein that are in fluid communication with each other. The hydraulic seat and the handlebar mounting portion are substantially and respectively located at two opposite sides of an imaginary plane that passes through the pivot location of the housing and that is parallel to the mounting axis. The piston is movably mounted to the piston chamber in the hydraulic seat, and is operably connected to the brake lever.

According to still another aspect of the disclosure, the brake control device includes a housing, a brake lever, a monolithic hydraulic seat and a piston. The housing is sized and shaped to be grasped by a user's hand, and includes a handlebar mounting portion at an end thereof that is configured to be mounted to a bicycle handlebar. The brake lever is pivotably connected to the housing at a pivot location of the housing. The hydraulic seat is fixedly mounted to the housing at another end of the housing that is distal from the handlebar mounting portion. The hydraulic seat defines a piston chamber therein. The piston is movably mounted to the piston chamber in the hydraulic seat, and is operably connected to the brake lever.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
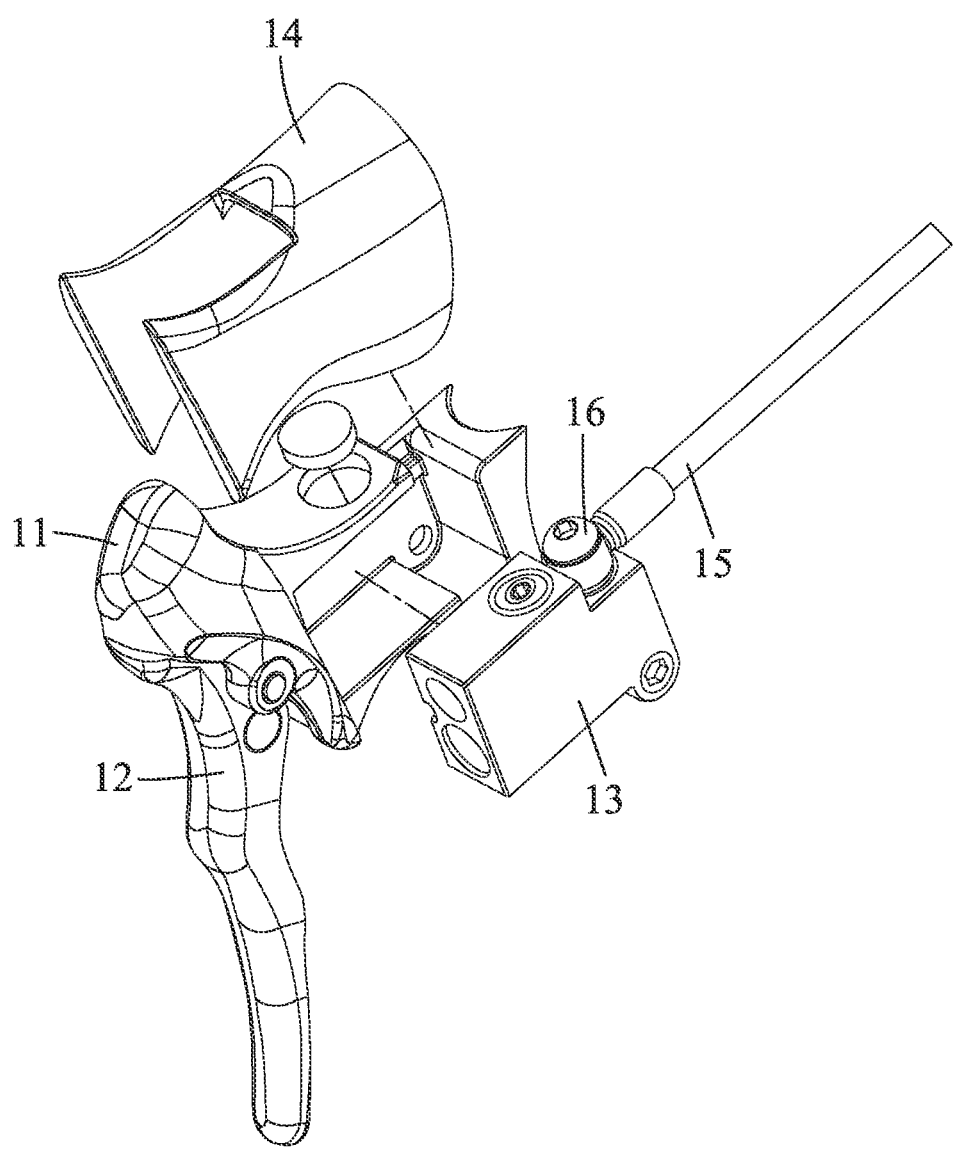
FIG. 1 is a partly exploded perspective view illustrating a conventional brake control device in U.S. Patent Application Publication No. 2012/0240715 A1.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
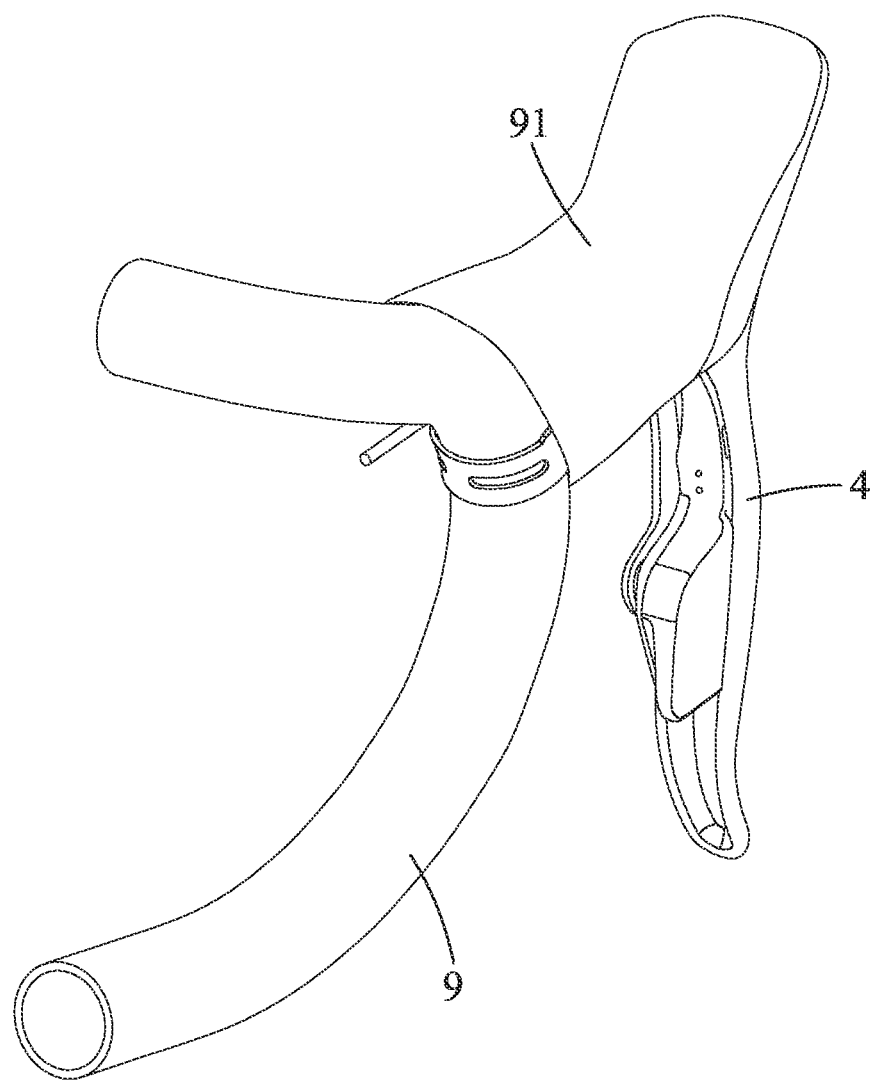
FIG. 2 is a perspective view illustrating a control device according to the disclosure mounted to a handlebar of a bicycle.
Figure 3:
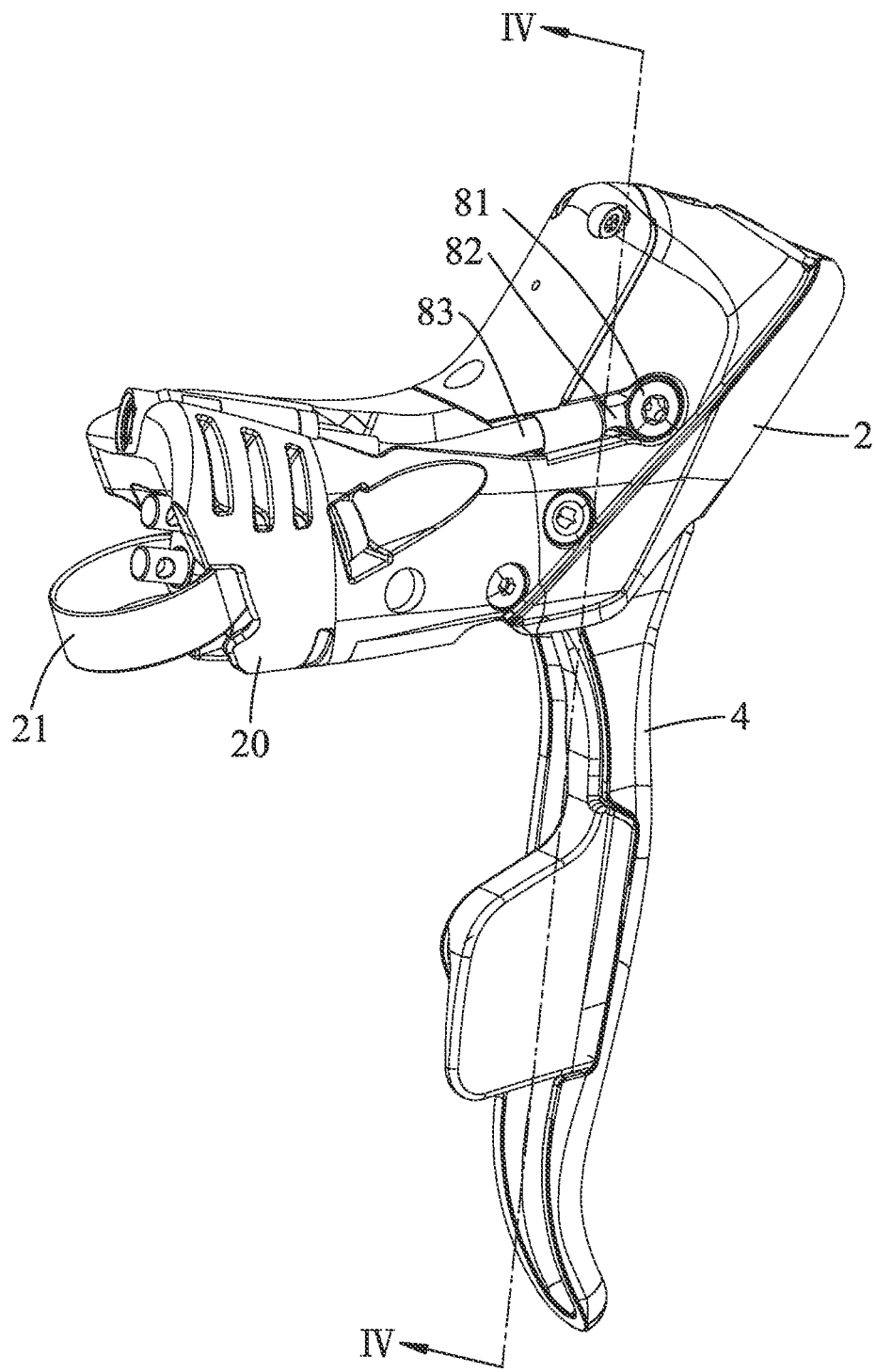
FIG. 3 is a perspective view of the control device.
Figure 4:
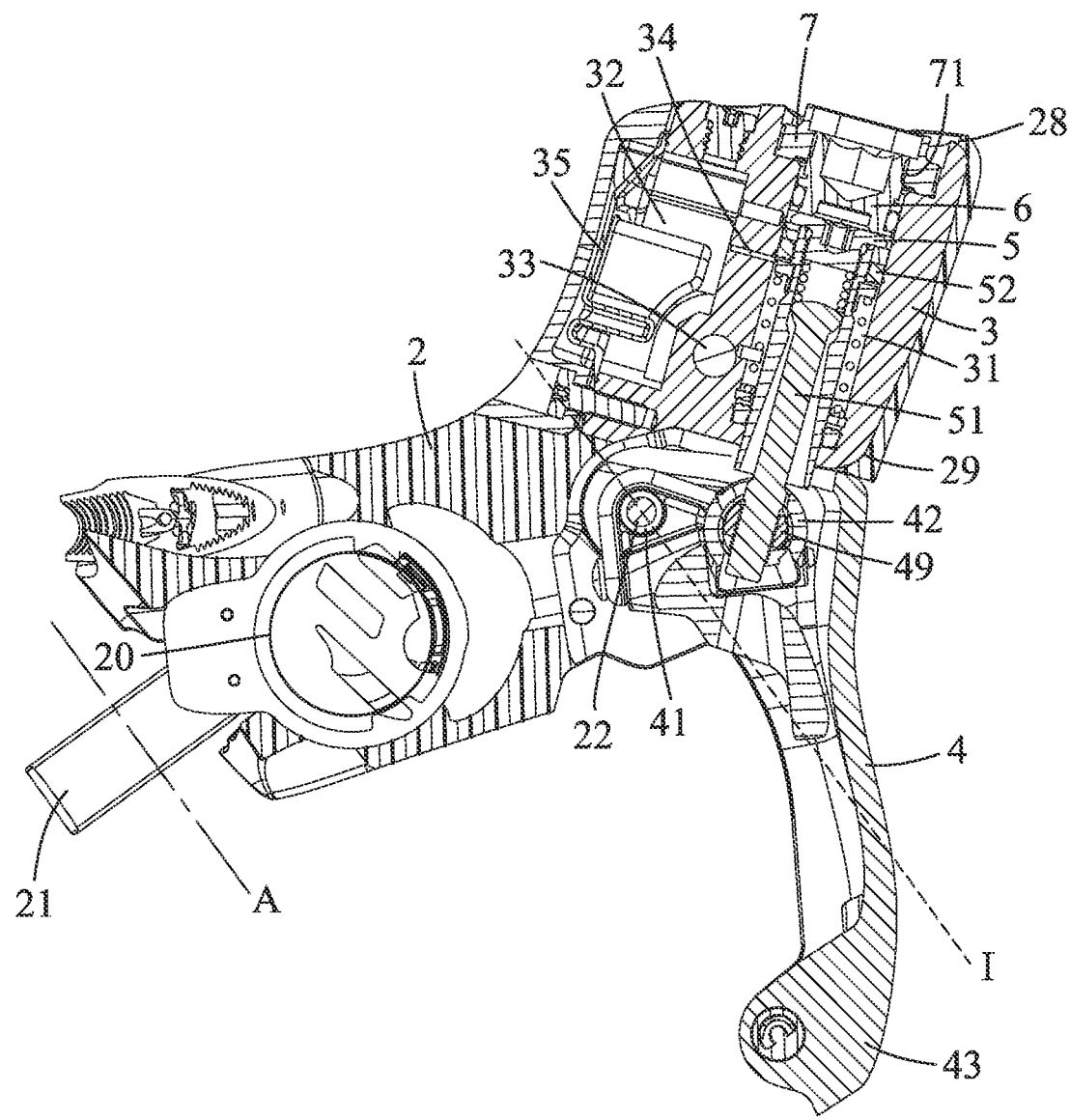
FIG. 4 is a sectional view of the control device taken along line IV-IV in FIG. 3.

Referring to FIGS. 2 to 4, a control device is for use in a hydraulic brake system of a bicycle (not shown), and is mounted to a handlebar 9 of the bicycle. The control device includes a housing or hood 2, a hydraulic seat or metal insert 3, a brake lever 4 and a piston 5. The handlebar 9 may be a drop-bar type handlebar, but is not limited to such. The control device may be sleeved by an outer cover 91 for protecting components mounted on the housing or hood 2 from water or dust.

The housing 2 is formed of a plastic, and is sized and shaped to be grasped by a user's hand. The housing 2 includes a handlebar mounting portion 20 at an end thereof that is configured to be mounted to the handlebar 9 and that has a mounting axis (A). In one embodiment, the handlebar mounting portion 20 may be mounted with a handlebar clamp 21 that is centered at an axis which is defined as the mounting axis (A) of the handlebar mounting portion 20. The handlebar mounting portion 20 may be mounted to the handlebar 9 in such a manner that the mounting axis (A) thereof is coaxial with or parallel to a tangent line to a portion of the handlebar 9 to which the handlebar clamp 21 is mounted.

The hydraulic seat 3 is disposed within the housing 2 at another end of the housing 2 distal from the handlebar mounting portion 20 in such a manner that the plastic of the housing 2 is adhered to the hydraulic seat 3. The hydraulic seat 3 is formed of a metal, and defines a piston chamber 31 therein. The piston chamber 31 is formed through the hydraulic seat 3. The housing 2 defines two openings 28, 29 through which two opposite open ends of the piston chamber 31 are respectively accessible. The hydraulic seat 3 further defines an installation hole 33 that is in fluid communication with the piston chamber 31. The installation hole 33 of the hydraulic seat 3 is adapted for a banjo bolt 81 to be mounted thereto through the housing 2, so as to fluidly connect a fluid hose 83 of the hydraulic brake system to the piston chamber 31 via a banjo 82 that is connected to an end of the fluid hose 83.

Figure 5:
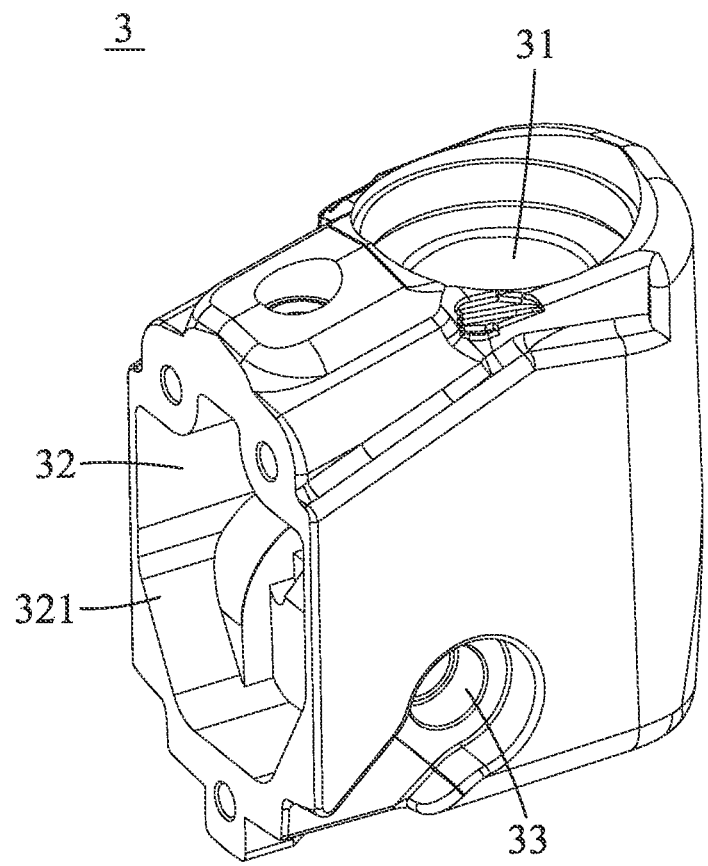
FIG. 5 is a perspective view of a hydraulic seat of the control device.

In one embodiment, the plastic of the housing 2 is adhered to the hydraulic seat 3 through a molding technique, in which the hydraulic seat or metal insert 3 is formed and machined before being placed into a mold (not shown) to be co-molded with the housing or hood 2. With particular reference to FIG. 5, the hydraulic seat or metal insert 3 may be formed as a single piece (i.e., monolithic), and be machined depending on which side of the handlebar 9 the control device is to be mounted to before being placed into the mold. In one embodiment, the hydraulic seat 3 may be fixedly mounted to the housing 2 so as to be immovable relative to the housing 2.

The brake lever 4 is pivotably connected to the housing 2 at a pivot or pivot location 22 of the housing 2. In one embodiment, the hydraulic seat 3 and the handlebar mounting portion 20 are substantially and respectively located at two opposite sides of an imaginary plane (I) that passes through the pivot 22 of the housing 2 and that is parallel to the mounting axis (A).

The piston 5 is movably mounted in the piston chamber 31 of the hydraulic seat 3, and is operably connected to the brake lever 4. The piston 5 is mounted with at least one sealing ring 52, and serves as a master piston in the hydraulic brake system. The control device may further include a piston rod 51 that interconnects the piston 5 and the brake lever 4. The brake lever 4 has a pivoted portion 41 that is pivotally connected to the housing 2, a connecting portion 42 that is connected to the piston rod 51, and a pressing portion 43 that is for being depressed by the user. In one embodiment, the connecting portion 42 is configured to move away from the hydraulic seat 3 when the pressing portion 43 is moved toward the handlebar 9.

In one embodiment, the hydraulic seat 3 may further define a hydraulic reservoir 32 that has an open end 321 (see FIG. 5), and at least one timing port 34 through which the piston chamber 31 fluidly communicates with the hydraulic reservoir 32. The open end 321 of the hydraulic reservoir 32 may be sealed by a flexible membrane 35 that is mounted to the hydraulic seat 3. As shown in FIG. 4, when the brake lever 4 is not depressed, the piston 5 is located such that the sealing ring 52 is located at one side of the timing port 34 opposite to the installation hole 33, so the timing port 34 and the installation hole 33 are in fluid communication with each other. After the brake lever 4 is depressed to drive the sealing ring 52 to move past the timing port 34, the timing port 34 and the installation hole 33 are isolated from each other, and a hydraulic fluid in the piston chamber 31 would be forced to flow into the hydraulic brake system via the fluid hose 83 with further movement of the piston 5 resulted from the depression of the brake lever 4.

The control device may further include an adjusting member 6 that is movably mounted to the piston chamber 31 of the hydraulic seat 3 and that is located at one side of the piston 5 opposite to the brake lever 4. The adjusting member 6 is configured to limit the range of movement of the piston 5, so as to adjust a distance by which the sealing ring 52 is moved for isolating the timing port 34 from the installation hole 33. In one embodiment, the piston chamber 31 is partially tapped, and the adjusting member 6 threadably engages the tapped portion of the piston chamber 31 of the hydraulic seat 3.

In one embodiment, the control device may further include an intermediate connecting member 49 that is pivotally connected to the connecting portion 42 of the brake lever 4 and that is threadably engaged with the piston rod 51.

The control device may further include a cap 7 that is mounted to the hydraulic seat 3 at one side of the adjusting member 6 opposite to the piston 5, and that is formed with a through hole 71 through which the adjusting member 6 is accessible.

Since the hydraulic seat 3 is located at another end of the housing 2 distal from the handlebar mounting portion 20 and since the opposite open ends of the piston chamber 31 are accessible through the housing 2, the assembly of the control device according to the disclosure is relatively labor-saving.

Figure 6:
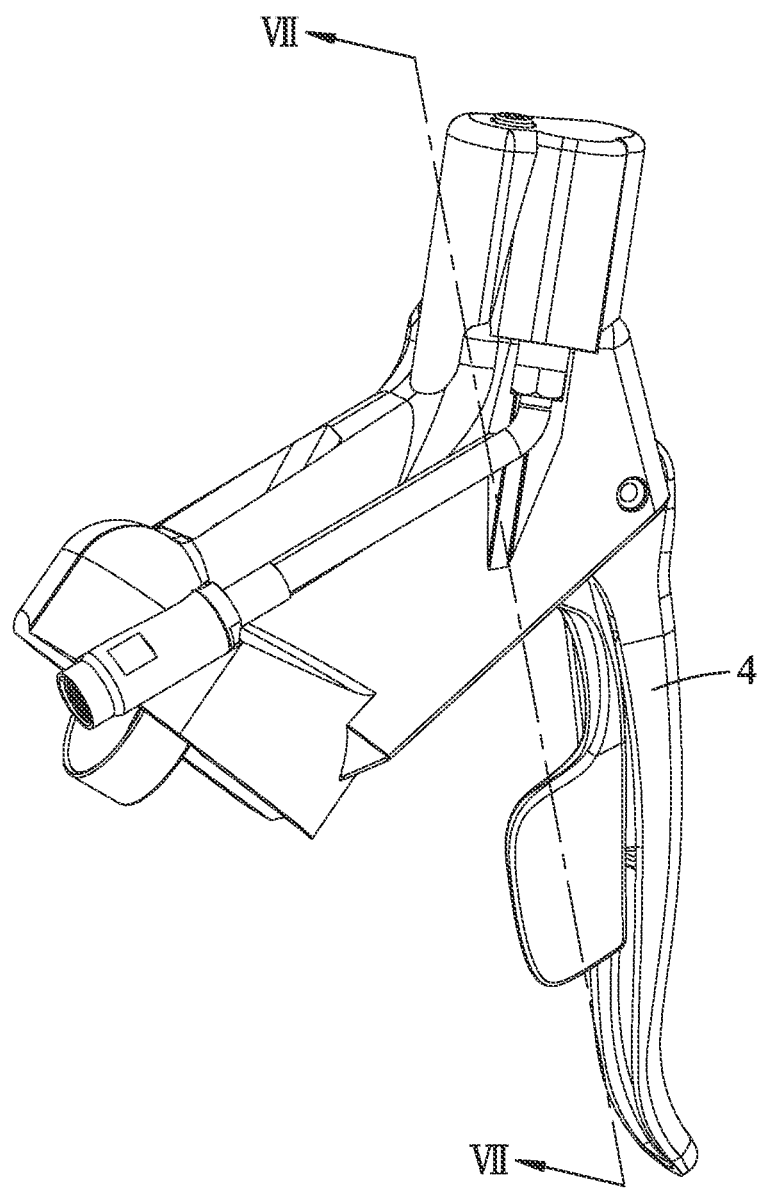
FIG. 6 is a perspective view of a modification of the control device according to the disclosure.
Figure 7:
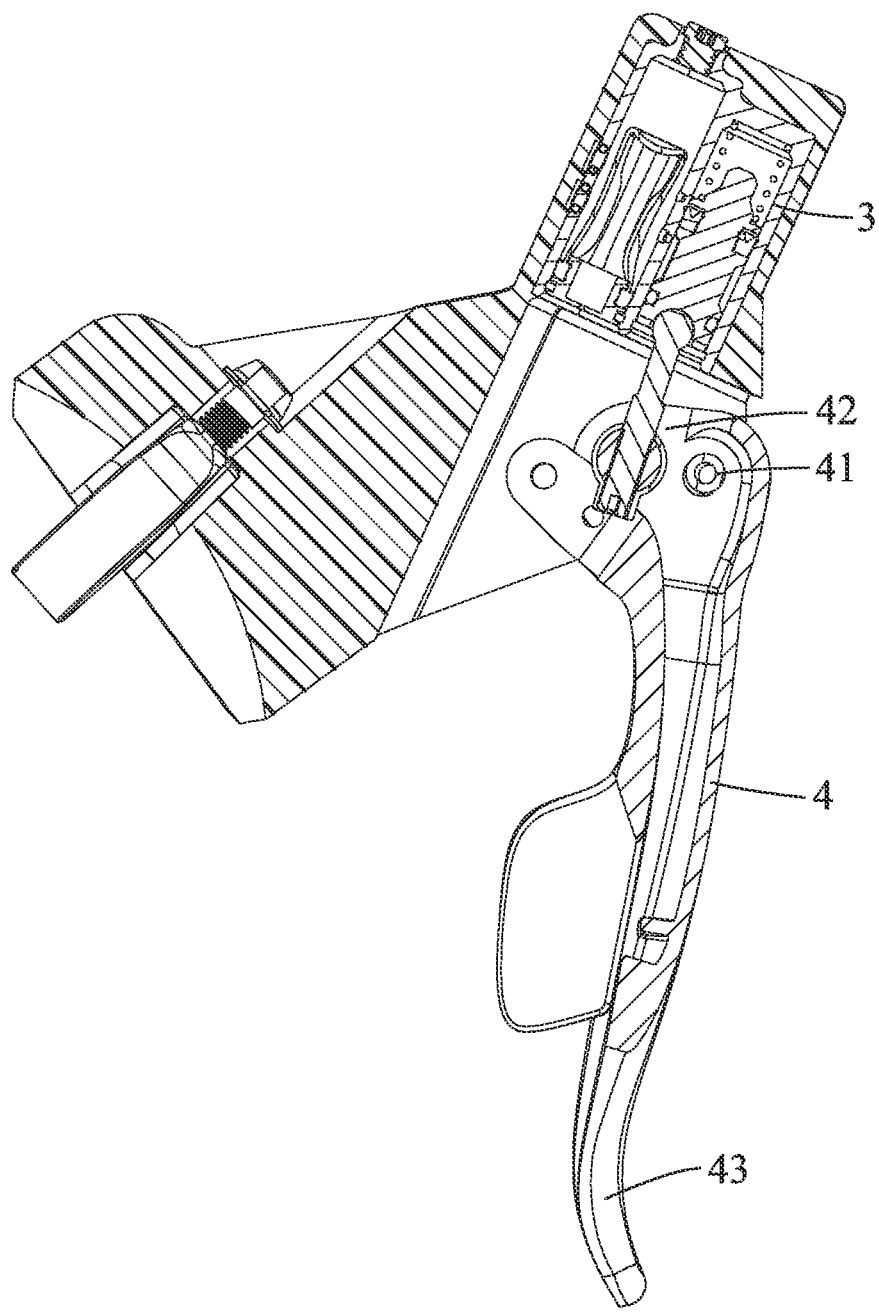
FIG. 7 is a sectional view of the modification taken along line VII-VII in FIG. 6.

Referring to FIGS. 6 and 7, a modification of the control device according to the disclosure is similar to the above-mentioned embodiments. In this modification, the connecting portion 42 of the brake lever 4 is configured to move toward the hydraulic seat 3 when the pressing portion 43 is depressed to move toward the handlebar 9 (Referring to FIG. 2).

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A control device adapted to be mounted to a bicycle handlebar, comprising:
    a housing formed of a plastic and sized and shaped to be grasped by a user's hand, the housing including a handlebar mounting portion at an end thereof that is configured to be mounted to the bicycle handlebar;
    a brake lever pivotably connected to the housing at a pivot of the housing;

a hydraulic seat disposed within the housing at another end of the housing that is distal from the handlebar mounting portion, the hydraulic seat being formed of a metal and defining a piston chamber and a hydraulic reservoir therein that are in fluid communication with each other; and a piston movably mounted to the piston chamber in the hydraulic seat, and operably connected to the brake lever;

wherein the plastic of the housing is molded around and adhered to the hydraulic seat through the molding.

2. The control device as claimed in claim 1, wherein the handlebar mounting portion is configured to be mounted to the bicycle handlebar about a mounting axis of the handlebar mounting portion, the hydraulic seat and the handlebar mounting portion being substantially and respectively located at two opposite sides of an imaginary plane that passes through the pivot of the housing and that is parallel to the mounting axis.

3. The control device as claimed in claim 1, wherein the hydraulic seat further defines an installation hole that is in fluid communication with the piston chamber, the installation hole of the hydraulic seat being adapted for a banjo bolt to be mounted thereto.

4. The control device as claimed in claim 1, wherein the hydraulic seat is fixedly mounted to the housing.

5. The control device as claimed in claim 1, further comprising an adjusting member that is movably mounted to the piston chamber of the hydraulic seat and that is located at one side of the piston opposite to the brake lever, the adjusting member being configured to limit the range of movement of the piston.

6. The control device as claimed in claim 5, wherein the adjusting member threadably engages the hydraulic seat.

7. The control device as claimed in claim 1, further comprising a piston rod that interconnects the piston and the brake lever.

8. The control device as claimed in claim 7, wherein the brake lever has a pivoted portion that is pivotally connected to the housing at the pivot, a connecting portion that is connected to the piston rod, and a pressing portion that is for being depressed by the user, the connecting portion being configured to move away from the hydraulic seat when the pressing portion is depressed to move toward the bicycle handlebar.

9. The control device as claimed in claim 7, wherein the brake lever has a pivoted portion that is pivotally connected to the housing at the pivot, a connecting portion that is connected to the piston rod, and a pressing portion that is for being depressed by the user, the connecting portion being configured to move toward the hydraulic seat when the pressing portion is depressed to move toward the bicycle handlebar.

10. A control device adapted to be mounted to a bicycle handlebar, comprising:

a housing formed of a first material, sized and shaped to be grasped by a user's hand, and including a handlebar mounting portion that is configured to be mounted to the bicycle handlebar about a mounting axis of the handlebar mounting portion;

a brake lever pivotably mounted to the housing at a pivot location of the housing;

a hydraulic seat formed as a single piece from a second material and disposed within the housing, the hydraulic seat defining a piston chamber and a hydraulic reservoir therein that are in fluid communication with each other, the hydraulic seat and the handlebar mounting portion being substantially and respectively located at two opposite sides of an imaginary plane that passes through the pivot location of the housing and that is parallel to the mounting axis; and a piston movably mounted to the piston chamber in the hydraulic seat, and operably connected to the brake lever, wherein the housing exists as adhered to the hydraulic seat through use of a molding technique.

11. The control device as claimed in claim 10, wherein the first material is a plastic and the second material is a metal.

12. The control device as claimed in claim 10, wherein the hydraulic seat further defines an installation hole that is in fluid communication with the piston chamber, the installation hole of the hydraulic seat being adapted for a banjo bolt to be mounted thereto.

13. The control device as claimed in claim 10, wherein the hydraulic seat is fixedly mounted to the housing.

14. The control device as claimed in claim 10, further comprising an adjusting member that is movably mounted to the piston chamber of the hydraulic seat and that is located at one side of the piston opposite to the brake lever, the adjusting member being configured to limit the range of movement of the piston.

15. The control device as claimed in claim 14, wherein the adjusting member threadably engages the hydraulic seat.

16. The control device as claimed in claim 10, further comprising a piston rod that interconnects the piston and the brake lever.

17. The control device as claimed in claim 16, wherein the brake lever has a pivoted portion that is pivotally connected to the housing at the pivot location, a connecting portion that is connected to the piston rod, and a pressing portion that is for being depressed by the user, the connecting portion being configured to move away from the hydraulic seat when the pressing portion is depressed to move toward the bicycle handlebar.

18. The control device as claimed in claim 16, wherein the brake lever has a pivoted portion that is pivotally connected to the housing at the pivot location, a connecting portion that is connected to the piston rod, and a pressing portion that is for being depressed by the user, the connecting portion being configured to move toward the hydraulic seat when the pressing portion is depressed to move toward the bicycle handlebar.

* * * * *